United States Patent
Hassan et al.

(10) Patent No.: US 12,328,765 B2
(45) Date of Patent: **\*Jun. 10, 2025**

(54) RADIO TERMINAL, METHOD TO OPERATE A RADIO TERMINAL, AND METHOD TO OPERATE A RADIO COMMUNICATIONS NETWORK

(71) Applicant: Robert Bosch GmbH, Stuttgart (DE)

(72) Inventors: Khaled Shawky Hassan, Laatzen (DE); Maria Bezmenov, Hildesheim (DE); Klaus Sambale, Oberhausen (DE); Nadia Brahmi, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/595,588

(22) Filed: Mar. 5, 2024

(65) Prior Publication Data

US 2024/0205978 A1 Jun. 20, 2024

Related U.S. Application Data

(63) Continuation of application No. 17/896,586, filed on Aug. 26, 2022, now Pat. No. 11,956,826, which is a
(Continued)

(30) Foreign Application Priority Data

Feb. 14, 2020 (EP) .................... 20157399

(51) Int. Cl.
*H04W 74/0808* (2024.01)
*H04W 4/40* (2018.01)
(Continued)

(52) U.S. Cl.
CPC ....... *H04W 74/0825* (2013.01); *H04W 72/23* (2023.01); *H04W 74/02* (2013.01); *H04W 4/40* (2018.02)

(58) Field of Classification Search
CPC ... H04W 4/40; H04W 72/02; H04W 72/1289; H04W 74/02; H04W 74/0816; H04W 74/0825

See application file for complete search history.

(56) References Cited

U.S. PATENT DOCUMENTS

| 11,445,547 B2* | 9/2022 | Hassan | ................ H04W 74/02 |
| 11,956,826 B2* | 4/2024 | Hassan | ............ H04W 74/0816 |

(Continued)

FOREIGN PATENT DOCUMENTS

| CN | 109526247 A | 3/2019 |
| CN | 109565864 A | 4/2019 |

(Continued)

OTHER PUBLICATIONS

ZTE, "Consideration on SPS and Grant-free," R2-1710322, 3GPP TSG-RAN WG2 Meeting #99bis, Oct. 2017 (6 pages).

(Continued)

*Primary Examiner* — Kashif Siddiqui
(74) *Attorney, Agent, or Firm* — Michael Best & Friedrich LLP

(57) ABSTRACT

A first radio terminal of a radio communications network. In one example, the first radio terminal includes an electronic processor, a communication module, and an antenna. The electronic processor is configured, together with the communication module, and the antenna, to cause the radio terminal to transmit, in a first transmission to a second radio terminal, data via a first subset of a set of SPS radio resources, reserve a second subset of the set of SPS radio resources for a subsequent data transmission, and in response to detecting a triggering event, skip the subsequent data transmission.

18 Claims, 5 Drawing Sheets

Related U.S. Application Data continuation of application No. 17/174,895, filed on Feb. 12, 2021, now Pat. No. 11,445,547.

(51) Int. Cl.
*H04W 72/23* (2023.01)
*H04W 74/02* (2009.01)

(56) References Cited

U.S. PATENT DOCUMENTS

| | | | | |
|---|---|---|---|---|
| 2015/0264734 A1* | 9/2015 | Chien | ................. | H04W 4/80 |
| | | | | 455/552.1 |
| 2016/0286548 A1* | 9/2016 | Huang | ............. | H04W 74/0808 |
| 2017/0188391 A1* | 6/2017 | Rajapogal | ......... | H04W 74/0816 |
| 2017/0289733 A1* | 10/2017 | Rajapogal | ............. | H04L 5/0082 |
| 2017/0332358 A1* | 11/2017 | Park | ...................... | H04L 1/1671 |
| 2019/0313375 A1* | 10/2019 | Loehr | ................... | H04W 72/04 |
| 2020/0008183 A1 | 1/2020 | Chen et al. | | |
| 2020/0029340 A1 | 1/2020 | He et al. | | |
| 2020/0120458 A1* | 4/2020 | Aldana | ................ | H04W 12/069 |
| 2021/0297193 A1* | 9/2021 | Noh | ....................... | H04L 1/1614 |
| 2021/0360624 A1* | 11/2021 | Zhang | ................... | H04L 5/0094 |
| 2022/0240341 A1* | 7/2022 | Kim | ....................... | H04L 5/0064 |
| 2023/0132414 A1* | 5/2023 | Shrestha | ............... | H04L 1/1851 |
| | | | | 370/329 |

FOREIGN PATENT DOCUMENTS

| | | |
|---|---|---|
| CN | 110521264 A | 11/2019 |
| WO | 2018006313 A1 | 1/2018 |
| WO | 2018027528 A1 | 2/2018 |

OTHER PUBLICATIONS

Translation of Chinese Patent Office Search Report for Application No. 202110181305.7 dated Sep. 20, 2024 (3 pages).

InterDigital Inc., "Mode 2a and Mode 2b for NR V2X Resource Allocation," 3GPP RAN WG1 Meeting AH 1901, Jan. 2019, 16 pages.

* cited by examiner

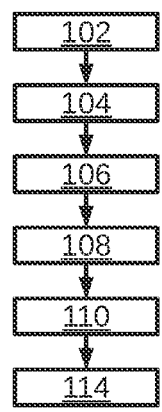
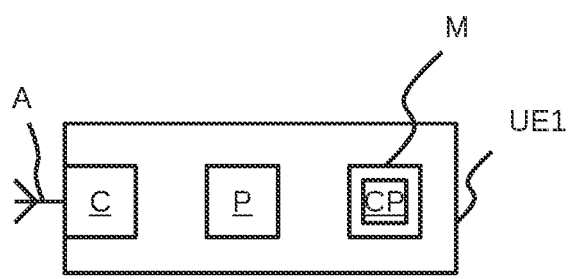
Fig. 1            Fig. 7
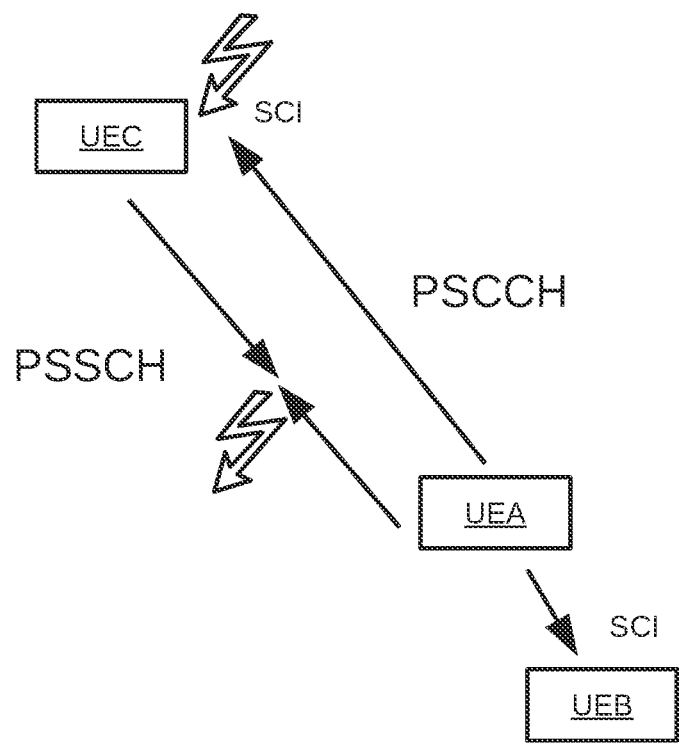
Fig. 6

RADIO TERMINAL, METHOD TO OPERATE A RADIO TERMINAL, AND METHOD TO OPERATE A RADIO COMMUNICATIONS NETWORK

RELATED APPLICATIONS

The present application claims priority to U.S. Non-Provisional patent application Ser. No. 17/896,586, filed on Aug. 26, 2022, which claims priority to U.S. Non-Provisional patent application Ser. No. 17/174,895, now U.S. Pat. No. 11,445,547, filed on Feb. 12, 2021, which claims priority to European Patent Application No. 20157399.5 filed on Feb. 14, 2020, the entire content of which is herein incorporated by reference.

BACKGROUND OF THE INVENTION

The invention concerns a first radio terminal, a method to operate the first radio terminal, and a method to operate a radio communications network.

Vehicle-to-Everything (V2X) is a system that enables passing information among vehicles, between a vehicle and infrastructure, between a vehicle and a network, or between a vehicle and other mobile devices. This system uses a direct communication technology known either as direct short-range communication (DSRC), in IEEE standards, or as sidelink communication, in 3GPP standards. In general, this direct sidelink communication channel is the direct channel between two mobile devices or a fixed infrastructure node.

SUMMARY OF THE INVENTION

According to a first aspect of the description a first radio terminal of a radio communications network, in particular a V2X UE of a V2X network, is provided, wherein said first radio terminal comprises at least one processor, at least one memory comprising computer program code, at least one communication module, and at least one antenna, wherein the computer program code and the memory are configured, together with the at least one processor, the at least one communication module, and the at least one antenna, to cause the radio terminal at least to: determine a SPS configuration for the first radio terminal, wherein the SPS configuration indicates a set of SPS, semi-persistently scheduled, radio resources of a shared device-to-device radio channel, in particular of a sidelink channel, SL-CH, wherein the indicated SPS radio resources are intended for a transmission by the first radio terminal; transmit, towards at least one second radio terminal, data via a first subset of the set of the SPS radio resources; select at least one sensing resource out of the set of SPS radio resources; sense the at least one sensing resource; determine a contention indicator in dependence on the sensing of the at least one sensing resource; and refrain from transmitting data via a second subset of the set of SPS radio resources if the contention indicator indicates a contention situation at the at least one sensing resource.

For example, the SPS configuration determination involves that the first radio terminal determines the SPS configuration via sensing, via control channel decoding and reservation decoding, via upper layer messages, e.g., (pre-) configuration, etc.

The proposed scheme provides an adaptive distributed SPS scheme. Due to the sensing operation at the cost of leaving out transmission opportunities of the subset of SPS sidelink resources, other radio terminals in the vicinity are able to start or continue their sidelink transmissions. Both, the centrally scheduling case and distributed scheduling case, benefit.

According to an advantageous example, the first radio terminal is further configured to: transmit, towards the at least one second radio terminal, data via the second subset of the set of SPS radio resources if the contention indicator indicates no contention situation at the at least one sensing resource.

Advantageously, a reselection procedure is provided allowing a reselection of the SPS resources, i.e., to avoid communication disruption or sensing disruption.

According to an advantageous example, the first radio terminal is further configured to: determine at least one auxiliary radio resource, wherein the at least one auxiliary radio resource and the set of SPS radio resources are disjoint; transmit, towards the at least one second radio terminal, data via the at least one auxiliary radio resource.

Using the auxiliary radio resources for transmission of payload data helps to avoid sequential collision of Long SPS transmissions by different radio terminals. The SPS reservations are protected from deterioration. The auxiliary radio resources are determined out-of-sequence with regard to the SPS radio resources. Therefore, transmission diversity is increased and QoS requirements can be maintained leaving out or reducing a transmission via the sensing resource.

According to an advantageous example, the data transmitted via the at least one auxiliary radio resource comprises an out-of-sequence indicator, which indicates that the auxiliary radio resource is an auxiliary radio resource.

Other radio terminals sensing the out-of-sequence-indicator get knowledge of the function, in particular that the auxiliary radio resource are not SPS resources, and may refrain from transmitting via the auxiliary radio resources detected.

According to an advantageous example, the selection of the at least one sensing resource comprises to: select the at least one sensing resource out of the set of SPS resources upon expiry of a time period since the first transmission via the set of SPS resources or upon reaching a number of transmissions conducted via the set of SPS resources.

The time period provides a deterministic behavior of the first radio terminal in using the SPS radio resources and sensing.

According to an advantageous example, the time period or the number of transmissions is determined in dependence on at least one of the following: a measured channel load of the physical device-to-device channel, a present status of an egress queue of the first radio terminal, and a QoS indicator.

An adaptive sensing is provided by considering, for example, the channel load. Therefore, the distributed transmission benefits as the first radio terminal adapts its behavior to its surrounding radio situation.

According to an advantageous example, determining the contention indicator comprises: decode SCI, Sidelink Control Information, present in the received at least one sensing resource; determine a plurality of radio resources reserved for a further radio terminal, in particular a set of SPS resources in dependence on the decoded SCI; and determine the contention indicator to represent no contention, if the second subset of the set of SPS radio resources and the determined plurality of radio resources are disjoint.

Accordingly, if the SCI information is used to determine that the second subset of SPS radio resources can be used to resume and continue the data transmission.

According to an advantageous example, the determining the contention indicator comprises: determine a received signal strength for the at least one sensing resource; compare the received signal strength with a threshold; and determine the contention indicator in dependence on the comparison.

If the signal strength is above the threshold, the first radio terminal determines a contention situation and can advantageously react in order to overcome a potential resource conflict.

According to an advantageous example, the sensing comprises: sensing a first part of the sensing resource; and transmitting, towards the at least one second radio terminal, data in a second part of the sensing resource.

Advantageously, sub-slot sensing and transmission increases the possibility of a data transmission. Moreover, the sensing is included and could even be sufficient to perform SCI decoding, if the first part comprises an SCI.

According to an advantageous example, the refraining comprises: determine, after the SPS configuration has lapsed, a further SPS configuration for the first radio terminal, wherein the further SPS configuration indicates a further set of further SPS radio resources of the shared device-to-device radio channel, in particular of the sidelink channel, SL-CH, wherein the indicated further SPS radio resources are intended for a transmission by the first radio terminal; and start transmitting, towards the at least one second radio terminal, data via the further set of SPS radio resources if a time period since the sensing of the at least one sensing resource and before the first transmission via the further set of SPS radio resources has not lapsed.

Therefore, depending on the QOS requirements, the data transmission is continued. The time period since the sensing guarantees the QoS requirement.

According to an advantageous example, the first radio terminal is further configured to: transmit, towards the at least one second radio terminal, the contention indicator, wherein the transmitted contention indicator indicates a contention situation at the at least one sensing resource and the identity of the at least one sensing resource.

Advantageously, the radio terminals in the vicinity have knowledge of the contention situation on the at least one sensing resource and may omit a transmission on this resource.

According to an advantageous example, the data transmitted towards the at least one second radio terminal comprises a reservation indicator, which indicates an identity of the subsequent SPS radio resource or subsequent auxiliary radio resource for transmitting by the first radio terminal.

By distributing the identity of the subsequent SPS radio resource or the subsequent auxiliary radio resource, the at least one second radio terminal is able to refrain from using these resources for transmission.

According to an advantageous example, the data transmitted towards the at least one second radio terminal comprises a sensing indicator, which indicates an identity of the subsequent SPS radio resource for sensing by the first radio terminal.

By distributing the identity of the subsequent sensing resource, the at least one second radio terminal is able to refrain from using these resources for transmission.

According to a second aspect of the description, a method to operate a first radio terminal of a radio communications network, in particular a V2X UE of a V2X network is provided, wherein the method comprises: determining a SPS configuration for the first radio terminal, wherein the SPS configuration indicates a set of SPS, semi-persistently scheduled, radio resources of a shared device-to-device radio channel, in particular of a sidelink channel, SL-CH, wherein the indicated SPS radio resources are intended for a transmission by the first radio terminal; transmitting, towards at least one second radio terminal, data via a first subset of the set of the SPS radio resources; selecting at least one sensing resource out of the set of SPS radio resources; sensing the at least one sensing resource; determining a contention indicator in dependence on the sensing of the at least one sensing resource; and refraining from transmitting data via a second subset of the set of SPS radio resources if the contention indicator indicates a contention situation at the at least one sensing resource.

According to a third aspect of the description, a method to operate a radio communications network is provided, wherein the radio communications network comprises the first radio terminal according to the first aspect and the second radio terminal.

BRIEF DESCRIPTION OF THE DRAWINGS

In the figures,

FIG. 1 depicts a schematical flow diagram for operating a first radio terminal;

FIG. 6 depicts a problem of the prior art; and

FIG. 7 depicts a structure of the first radio terminal.

DETAILED DESCRIPTION

Figure 2:
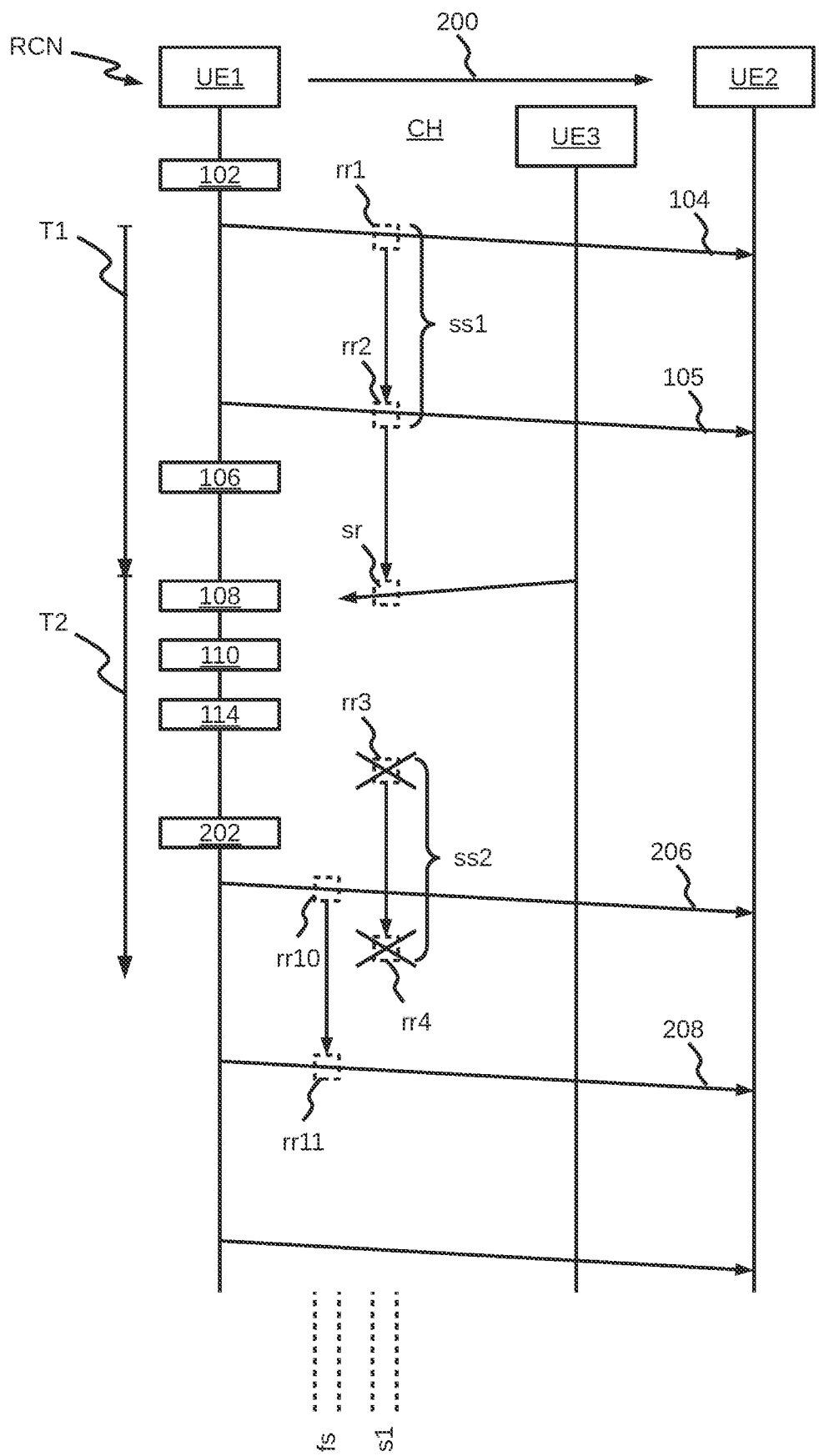
FIGS. 2 to 5 each depict a schematical sequence diagram for operating a radio communications network.

FIG. 1 depicts a schematical flow diagram for operating a first radio terminal of a radio communications network, in particular for operating a V2X UE of a V2X network. According to a step 102, the first radio terminal determines a SPS configuration for the first radio terminal, wherein the SPS configuration indicates a set of SPS, semi-persistently scheduled, radio resources of a shared device-to-device radio channel, in particular of a sidelink channel, SL-CH. The indicated SPS radio resources are intended for a transmission by the first radio terminal.

The sidelink channel SL-CH comprises, for example, a physical sidelink shared channel, PSSCH, and a physical sidelink control channel, PSCCH. Sidelink describes a UE to UE interface for sidelink communication, sidelink discovery and V2X sidelink communication. The sidelink corresponds to a PC5 interface for sidelink communication and sidelink discovery, and V2X sidelink communication. Sidelink communication comprises functionality enabling ProSe Direct Communication between two or more nearby UEs, using E-UTRA technology but not traversing any network node.

The determination according to step 102 is done by a central scheduling unit or in a distributed way. Therefore, according to the example of a distributed scheduling, the step 102 comprises a determination of the transmission opportunities in the form of the SPS configuration including the set of SPS resources rr1-rr4. The determination according to step 102 of the distributed scheme may comprise sensing resources to be free or occupied.

According to a step 104, the first radio terminal transmits, towards at least one second radio terminal, data via a first subset of the set of the SPS radio resources. The first radio terminal may reserve every time only one subsequent look ahead SPS radio resource, i.e., eventually for a next future transmission. If a stopping condition is triggered as in a step 106, the first radio terminal skips data transmission either the next transmission opportunity or a subsequent next transmission opportunity with a time maximum. The latter may be allowed to fulfil a QoS, latency requirement, or UE capabilities like processing time.

According to the step 106, the first radio terminal selects at least one sensing resource out of the set of SPS radio resources.

According to a step 108, the first radio terminal senses the at least one sensing resource.

According to a step 110, the first radio terminal determines a contention indicator in dependence on the sensing of the at least one sensing resource.

According to a step 114, the first radio terminal, refrains from transmitting data via a second subset of the set of SPS radio resources if the contention indicator indicates a contention situation at the at least one sensing resource. The step 114 comprises to clear the configured sidelink grant at the end of the corresponding SC, Sidelink Control, Period. In other words, an SPS release for the future SPS radio resources is conducted.

The SC Period consists of a transmission of SCI, Sidelink Control Information, and its corresponding data. The SCI contains the sidelink scheduling information such as resource block assignment, modulation and coding scheme, Group Destination ID (for sidelink communication) and PPPP, ProSe Per-Packet Priority, (for V2X sidelink communication), The data transmitted towards the at least one second radio terminal comprises control information and payload.

According to an example, the data transmitted towards the at least one second radio terminal comprises a reservation indicator, which indicates an identity of the subsequent SPS radio resource or subsequent auxiliary radio resource for transmitting by the first radio terminal.

According to an example, the data transmitted towards the at least one second radio terminal comprises a sensing indicator, which indicates an identity of the subsequent SPS radio resource for sensing by the first radio terminal.

The selection of the sensing resource according to step 106 is exemplified in the following. According to an example, the selection procedure is configured via, e.g., SIB acquisition, e.g., SIBX, SIBY, SIB21, SIB 26 or via dedicated RRC messages. According to an example, the selection information about the location and selection procedure of the sensing resource is configured in the resource pool configuration information element, e.g., in the Sidelink BWP configuration, and or SL carrier configuration. A cell may activate or deactivate the operation during SIB acquisition or re-acquisition or during RRC reconfiguration or configuration.

Skipping a transmission of the configured SPS radio resources and sensing the sensing resource instead is referred to as skipping in the following. A triggering event for determining the sensing resource is referred to in the following in relation with a timer or counter.

When the SIB is acquired with either a configuration of the skipping and/or a configuration of a timer, or the activation to perform the skipping operation or the activation to execute of the said timer/counter operation, the first radio terminal UE1 is expected to perform skipping according to the (pre-)configured timer/counter values as specified before.

According to an example, in the covered case, the network provides the timer/counter values, for example via a RRC configuration received by the radio terminal.

According to a further example, in the out-of-coverage case, the UE uses its pre-configured configuration of the timer/counter values or an information element received via a sidelink control channel.

For example, a SIB (e.g., SIBX, SIBY, SIBZ etc.) includes sl-ConfigCommon, which, e.g., may contain a sl-BWP-Config and/or SL-BWP-Pool-Config or sl-ResourcePool-Config information elements, which contain the configuration and/or activation/deactivation of the said fields, i.e., in the TX resource pool(s) configuration.

For example, when a dedicated RRC message configures either the skipping mechanism or the skipping counter/timer, the values of the timer/counters and/or the procedure for the skipping, e.g., sub-slot, delayed skipping, early skipping, etc., are configured. If not, the configuration in the SIB information and/or configuration in SL-preconfiguration messages may be used.

According to an example, a cell-manager, for example residing in a base station, decides to activate or deactivate the said operations/timers/counters. Hence, the first radio terminal checks the RRCReconfigurationSidelink (or any other SL RRC Configuration element) or the SIB TX pool configuration (or any configuration element) for at least one of the following fields:

- SL-ConfiguredResourcesSkippingActivation/Deactivation, e.g., Boolean {TRUE or FALSE};
- SL-ConfiguredResourcesSkippingMode, e.g., enumerate {EarlySkipping, LateSkipping, SubSlot-Skipping (first or last)};
- SL-ConfiguredResourcesSkippingTimerActivation/Deactivation or SL-ConfiguredResourcesSkippingCounterActivation/Deactivation or
- SL-ConfiguredResourcesSkippingTimer/SL-ConfiguredResourcesSkippingCounter, where the timer may be enumerate {ms20, ms50, ms100, ms200, ms300, ms400, ms600, ms1000, ms1500, ms2000} the counter may be enumerate {N5, N10, N20, N30, N40, N60, . . . etc.}.

If the first radio terminal UE1 is configured by upper layers (e.g., by RRC dedicated messages or during SIB (e.g., SIBX, SIBY, SIBZ, . . . ) acquisition) to perform an out of sequence transmission. The first radio terminal UE1 checks if the use of out-of-sequence operation is "enabled" or "disabled" after finding the skipping and/or the skipping timer configuration. If the above skipping operation or skipping timer/counter are configured and "enabled", the first radio terminal UE1 examines the acquired SIB, e.g., SIBX, SIBY, SIBZ, etc., if it contains (in one of its information elements, e.g., SL-BWP-PoolConfig) or RRCReconfigurationSidelink if it contains (in one of its information elements)), for example: SL-ConfiguredResourcesOutOfSequenceEnabled/SL-ConfiguredResourcesOutOfSequenceEnabled (or one field, e.g., SL-ConfiguredResourcesOutOfSequence with Boolean {TRUE or FALSE}), and SL-ConfiguredResourcesOutOfSequenceMode, e.g., enumerate {AfterSkipping, BeforeSkipping}.

According to an example, if the out of sequence is configured, a lower layer, e.g., MAC, may generate a MAC PDU that contains: a MAC control element, CE, with one logical channel ID (LCID) containing the following:

1 (or more bits) Informing one or more stations that this current message is an out-of-sequence message for a configured resources;

If the out of sequence message is generated after skipping (e.g., when SL-ConfiguredResourcesOutOfSequence Mode=AfterSkipping}, this MAC CE may contain N-bits informing other station about: whether the SPS will continue for another (one or more) periods; and Interference station layer 2 ID or Layer 1 D and or SPS/configured resource ID of the skipped process.

FIG. 2 depicts a schematical sequence diagram for operating the radio communications network RCN. According to an arrow 200, the focus of the illustration is on a data transmission from the first radio terminal UE1 to the second radio terminal UE2.

The first subset ss1 is used in steps 104, 105 to transmit data towards the second radio terminal UE2.

The selection of the step 106 of the at least one sensing resource sr comprises to select the at least one sensing resource sr out of the set s1 of SPS resources rr1-rr4 upon expiry of a time period T1 since the first transmission via the set of SPS resources rr1-rr4 or upon reaching a number of transmissions conducted via the set s1 of SPS resources rr1-rr4.

According to an example, the time period T1 is determined based on a predefined rule taking into account a resource reselection counter SL_RESOURCE_RESELECTION_COUNTER and a configurable threshold probResourceKeep for a probability of keeping SPS radio resources. The threshold probResourceKeep is selected by upper layers to maintain the SPS radio resources, which are initially selected for periodic transmission longer after the expiration of the SL_RESOURCE_RESELECTION_COUNTER. When the radio terminal UE1 reserves a finite number of SPS radio resources, the predefined rule is applied. As a specific example of the predefined rule, the number of subframes in one set of time and frequency resources related to transmission opportunities of the PSSCH may be given as a specific value (e.g., C resel). At this time, the specific value C resel may be defined as 10* SL_RESOURCE_RESELECTION_COUNTER (when a specific counter (e.g. SL_RESOURCE_RESELECTION_COUNTER) is set), otherwise C resel may be set to 1 (for example if SL_RESOURCE_RESELECTION_COUNTER is not set). A random value of SL_RESOURCE_RESELECTION_COUNTER of 5 or more and 15 or less may be set. For example, when SL_RESOURCE_RESELECTION_COUNTER is 5, a total of 50 subframes may be reserved for transmission of PSSCH. For example, when SL_RESOURCE_RESELECTION_COUNTER is 15, a total of 150 subframes may be reserved for transmission of PSSCH. After reaching the end of these reserved SPS resources, the radio terminal UE1 determines whether to select the next resource, following the previously determined SPS scheme, as the sensing resource sr by comparing a determined random number and the threshold probResourceKeep.

The time period T1 or the number of transmissions is determined in dependence on at least one of the following: a measured channel load of the physical device-to-device channel, a present status of an egress queue of the first radio terminal UE1, and a QoS indicator. According to an example, the time period T1 is selected from a set of preconfigured time periods. According to an example, the time period T1 is configured via the network. According to an example, the time period T1 is fixed.

According to the present example, in step 108 the first radio terminal UE1 senses an occupation of the sensing resource sr, as a third radio terminal UE3 is transmitting at least via a part of the sensing resource sr. Therefore, the sensing of the step 108 comprises: sensing a first part of the sensing resource sr; and transmitting, towards the at least one second radio terminal UE2, data in a second part of the sensing resource sr.

Therefore, if sub-slot operation is allowed, the first radio terminal UE1 skips only a sub-slot in the sense of the first part of configured SPS radio resource allocated after which a triggering condition is valid. For example, the first radio terminal UE1 may perform at least one of the following:

defer transmission to the end of the slot in the sense of the second part, therefore leaving the beginning symbols of the slot free for sensing;

an early transmission at the beginning of slot, in the sense of the second part, and leaving enough symbols in remaining time of the slot to allow sensing on such symbols, in the sense of the first part.

In both examples, the first radio terminal UE1 is able to transmit on parts of the slot. In these cases, the first radio terminal UE1 has to include its SCI for other radio terminals UE2, UE3 to sense and decode said transmission. Either a defer or an early transmission within a slot has to include in the SCI enough information to identify at least: the next transmission reservation, an indication of a partial slot skipping. In both examples, it is up to the first radio terminal UE1 to do either a segmentation of the resources (as the transmission block size has to be reduced to the amount of resources in the sub-slot duration) or to drop the data that cannot be fitted in the sub-slot transmission. If the UE is requested to sense SCI and its associated RSRP, then the UE may select to defer the transmission to the end of the slot. However, if RSSI sensing is allowed, both examples are suitable for grant skipping and sensing.

If the first radio terminal UE1 performed a sub-slot resource skipping and identified a clear channel (i.e., no collision or half-duplex detected), the first radio terminal UE1 resumes transmitting via the configured SPS radio resources. The advantage of having only sub-slot skipping is to allow reservation continuity, where other radio terminals UE2 and UE3 will consider the first radio terminal UE1 always transmits on the indicated SPS radio resources. However, in a full slot skipping, and if not cross-reserved by other transmission, other UEs may assume complete grant skipping and pre-empt the said UE reservations. This may be avoided by partial slot skipping.

For partial slot skipping, every time the first radio terminal UE1 performs the partial skipping, the first radio terminal UE1 avoids transmission at locations, in particular of the skipped first part: At the beginning, i.e., to decode possible colliding SCI or the associated PDCCH/PDSCH DMRS; Another part of the slot (not necessarily the first part), where the first radio node UE1 may skip possible DMRS locations (for correlation detection) or RSSI computation; and the first radio terminal UE1 may decide to skip any part of the slot and decide to do energy detection.

According to an example, the step 110 of determining the contention indicator CONT, not shown in FIG. 2, comprises: determine a received signal strength for the at least one sensing resource sr; compare the received signal strength with a threshold; and determine the contention indicator CONT in dependence on the comparison.

According to the step 114, the radio terminal UE1 decides to refrain from using the already scheduled resources rr3 and rr4 in order to avoid collisions on the radio channel CH.

According to an example, the refraining 114 comprises: determine, according to a step 202, after the SPS configuration has lapsed, a further SPS configuration for the first radio terminal UE1, wherein the further SPS configuration indicates a further set fs of further SPS radio resources rr10, rr11 of the shared device-to-device radio channel CH, in particular of the sidelink channel, SL-CH, wherein the indicated further SPS radio resources rr10, rr11 are intended for a transmission by the first radio terminal UE1; and start transmitting, according to steps 416, 418, towards the at least one second radio terminal UE2, data via the further set fs of SPS radio resources rr10, rr11 if a time period T2 since the sensing 108 of the at least one sensing resource sr and before the first transmission via the further set of SPS radio resources rr10, rr11 has not lapsed. According to an example, the time period T2 is selected from a set of preconfigured time periods. According to an example, the time period T2 is configured via the network. According to an example, the time period T2 is fixed.

The first radio terminal UE1 may drop a transmission of data in its egress queue or postpone the transmission of the data and wait for the resources rr10 and rr11. However, a transmission of data in the egress queue is skipped in the sidelink transmission granted resource in form of the sensing resource sr. Accordingly, the first radio terminal UE is able to listen to other colliding transmitters like UE3, i.e., transmitter coexisting on the same reserved periodic resources.

According to an example, the first radio terminal UE skips one (or more) configured sidelink SPS resources, when triggered by expiry of the timer T1 exceeding a pre-configured threshold, value or transmits a consecutive number of periods of the configured sidelink resources. A relation between the timer T1, the number of consecutive transmissions after the sensing resource sr, and a reselection counter for reselecting the radio resources of the SPS configuration and a Probability of Resource Keep can be configured. According to an example, the timer T1 can start once the SPS starts and allows to be triggered after the first reselection counter goes to 1 and/or a probability of resource keep is accepting periodic extension.

According to an example, based on the QoS or latency requirement, the first radio terminal UE1 extends a transmission for at least another configured time/frequency resources like rr10 and rr11, after the triggering condition for determining the sensing resource sr, and delay the skipped transmission until a following subsequent configured grant for radio resources rr10, rr11.

According to an example, sub-slot transmission is allowed and the UE skips only a part of the slot to perform sensing. E.g., the first part of a slot can be skipped to be able to decode the SCI decoding and the corresponding RSRP measurements. E.g., the second part of a slot can be skipped to perform RSSI measurement only. E.g., any part of the slot and rather do an energy detection on the skipped part. If the radio terminal UE1 identifies a resource collision or half-duplex problem, the radio terminal UE1 decides to cancel all remaining configured SPS resources rr3, rr4 and delete the existing configured SPS reservations.

The condition to determine the sensing resource sr from the SPS radio resources comprises at least one of the following:
The timer T1, which starts after a first transmission of a periodic transmission opportunities, expires before an upcoming transmission opportunity; and/or
A counter, which counts the number of consecutive transmission made in the configured resource set s1, spaced with a periodicity.

In order to identify which resources are selected to be sensed instead of being used for transmission, the first radio terminal UE1 selects the following transmission opportunity/opportunities: A subsequent transmission opportunity/opportunities that directly follows the triggering event described before; a subsequent transmission opportunity/opportunities that follows one or more transmission of the configured SPS radio resources that can be transmitted following the triggering event and not longer than a relax time period;

After the first radio terminal UE1 decided to start sensing on the sensing resource sr, the first radio terminal UE1 selects only one configured SPS radio resource for sensing. During the time identified for the at least one sensing resource sr, the UE switches it receiver on and performs sensing, which can comprise SCI decoding.

According to an example, the first radio terminal UE1 performs sensing (once the triggering condition and event are satisfied) on multiple configured sidelink transmission opportunities. These opportunities may be: A periodic sequence of the configured sidelink granted transmission opportunities; A subset of resources selected randomly from the original transmission opportunities; A quasi-periodic set of transmission opportunities which may follow a pattern or they may be chosen based on, e.g. the traffic density of the first radio device UE1, the arrival rate of MAC PDUs at the first radio terminal UE1, and/or a number of the MAC PDUs left in the egress queue of the first radio terminal UE1.

Figure 3:
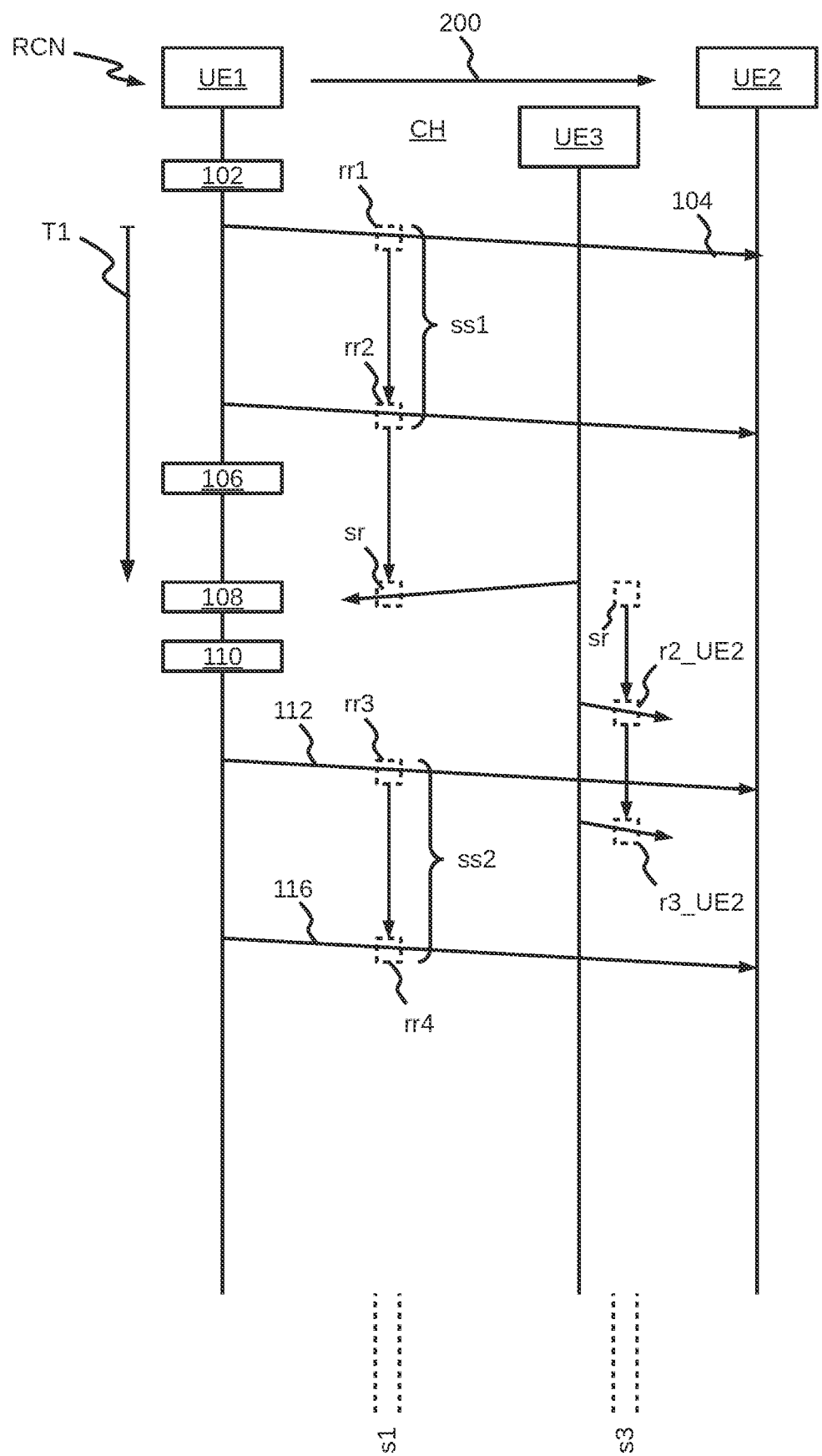

FIG. 3 depicts a schematical sequence diagram for operating the radio communications network RCN.

According to an example, the step 110 of determining the contention indicator CONT comprises: decode SCI, Sidelink Control Information, present in the received at least one sensing resource sr; determine a plurality of radio resources r2_UE2, r3_UE3 reserved for a further radio terminal UE3, in particular a set s3 of SPS resources r2_UE2, r3_UE3 in dependence on the decoded SCI; and determine the contention indicator CONT to represent no contention, if the second subset ss2 of the set s1 of SPS radio resources rr1-rr4 and the determined plurality of radio resources r2_UE3, r3_UE3 are disjoint. Decoding the SCI may result in determining the source ID of the transmitting third radio terminal UE3, and/or a destination ID of the transmission.

According to steps 112, 116, the first radio terminal UE1 resumes its transmission and transmits, towards the at least one second radio terminal UE2, data via the second subset ss2 of the set s1 of SPS radio resources rr1-rr4 if the contention indicator CONT indicates no contention situation at the at least one sensing resource sr.

Once the evaluation results in a positive collision or half-duplex problem, the first radio terminal UE1 sets the contention indicator CONT to parametrize the outcome of the evaluation process, such that: SL_resourceContention=TRUE. In the same example, if the evaluation is not identifying any collision and/or half-duplex issue, the contention indicator CONT stays as the default value "FALSE".

According to an example, if the SL_resourceContention is set to TRUE, the first radio terminal UE1 triggers the reselection procedure if the UE1 is allocated to those sidelink resources using an autonomous resource mode, i.e., mode 2, or the UE1 sends to the network configured grant reconfiguration request. Additionally, the UE1 deletes any remaining configured sidelink grants associated with the said periodic transmission.

The first radio terminal UE1 that skipped one transmission for sensing at sensing resource sr, transmits the contention indicator CONT to the other radio terminals UE2, UE3 in the vicinity of the first radio terminal UE1, announcing possible collision or half-duplex problem. In this case, the first radio terminal UE1 may inform only the conflicting radio terminal UE3, i.e., UE1 existing in the same SPS reserved period where the said UE1 is suspecting UE3 to be colliding or overlapping with its own resources. A colliding radio resource or half-duplex situation may be detected based on: SCI decoding and/or RSRP measurements, RSSI decoding; Physical layer ID (L1 ID) resolution, e.g., if the one or more of the UEs is transmitting in the same time-slot (a half-duplex issue) and the L1-ID are within the UE L1 ID list; Layer-2 ID (L1 ID) resolution, e.g., if the one or more of the UEs is transmitting in the same time-slot (a half-duplex issue) and the L1-ID are within the UE L1 ID list. Based on this resolution (and the UE decoding capability and implementation), the first radio terminal UE1 identifies if resources are colliding/overlapping with that of other UEs.

Hence, if the first radio terminal UE1 detects a contention situation with colliding or overlapping resources, as a consequence of resolving the situation the first radio terminal UE1 transmits an the out-of-sequence transmission such that:

The first radio terminal UE1 sends the said out-of-sequence message via at least one auxiliary radio resource ar1, ar2 in a unicast transmission (i.e., to the identified UE who rises the collision/overlapping problem).

The first radio terminal UE1 transmits said out-of-sequence message in a groupcast transmission (i.e., to those identified UEs who rise the collision/overlapping problem). In this case, those UEs have to reside in a certain communication range. This collision/half-duplex situation resolution communication range is configured for the first radio terminal UE1. Hence, any UE may exist outside this communication range may not be requested to fulfil resolution to the said collision/half-duplex situation.

The first radio terminal UE1 send the said out- of-sequence message in a broadcast transmission (i.e., to all UEs who exist in the vicinity of the said UE). In this case, the UE may not be able to identify the colliding/overlapping UE-ID(s).

In all communication cast types, unicast, groupcast, and broadcast, the out- of-sequence control information may be carried via a physical sidelink control information (SCI) or a PC5 (i.e., sidelink interface) radio resource control (RRC) signaling.

According to an example, the first radio terminal UE1 transmits on each transmission opportunity according to the SPS radio resources, at least, an initial transmission and one more redundancy transmission version, which are, for example, another code version or the same copy of the initial transmission. In each of these transmissions, there could be reservations including one or more of the following cases:

For Initial transmissions, there could be reservation for another redundancy version associated with the initial transmission, and a reservation for another initial subsequent transmissions;

Redundancy version(s) only reserve subsequent transmission of similar redundancy versions, e.g., of the same levels, e.g., RV1, of future subsequent re-transmission;

Initial transmission and redundancy versions reserves each other's resources also in subsequent transmission opportunity in a chain-based reservation.

In the last case as stated above, if only one configured time/frequency resources is skipped, there will be at least one reservation remaining for a subsequent transmission following the skipped transmission slot.

A data packet is generated by upper layers and segmented at the RLC layer (after PDCP packing). One segment is referred to in a lower layer (from MAC on) as a transport block (TB). Transport block size (TBS) is generally computed after the physical layer modulation and coding scheme selection (i.e., this mean it includes information data and some parity bits. Finally, a cyclic redundancy check is added to this block representing the redundancy version, which is composed of: some information data, some parity bits, and CRC. The CRC itself is a function of the other two data parts (information and parity). Since the channel coding is using generally low modulation coding scheme depth, a circular buffer is used to sort the information data and all possible parity bits. In the first redundancy version, some more information bits and some parity bits are selected from the circular buffer. If another re-transmission is needed (either for blind re-transmission or Acknowledgement based retransmissions), another redundancy version is used. In this case, this new (2nd) redundancy version is considering some (other) information bits+some (other) parity bits, which is not the same values as the first transmission for example. Similar to the first version of the redundancy versions, a CRC block is combined to the encoded TB.

Each redundancy version refers to part of the information bits and part of the parity bits arranged in a circular buffer. The CRC result for each redundancy version, e.g., according the CRC function polynomial function provided, is appended to each redundancy version bit forming the complete Transport Block size, i.e., CRC of each redundancy version is different.

Figure 4:
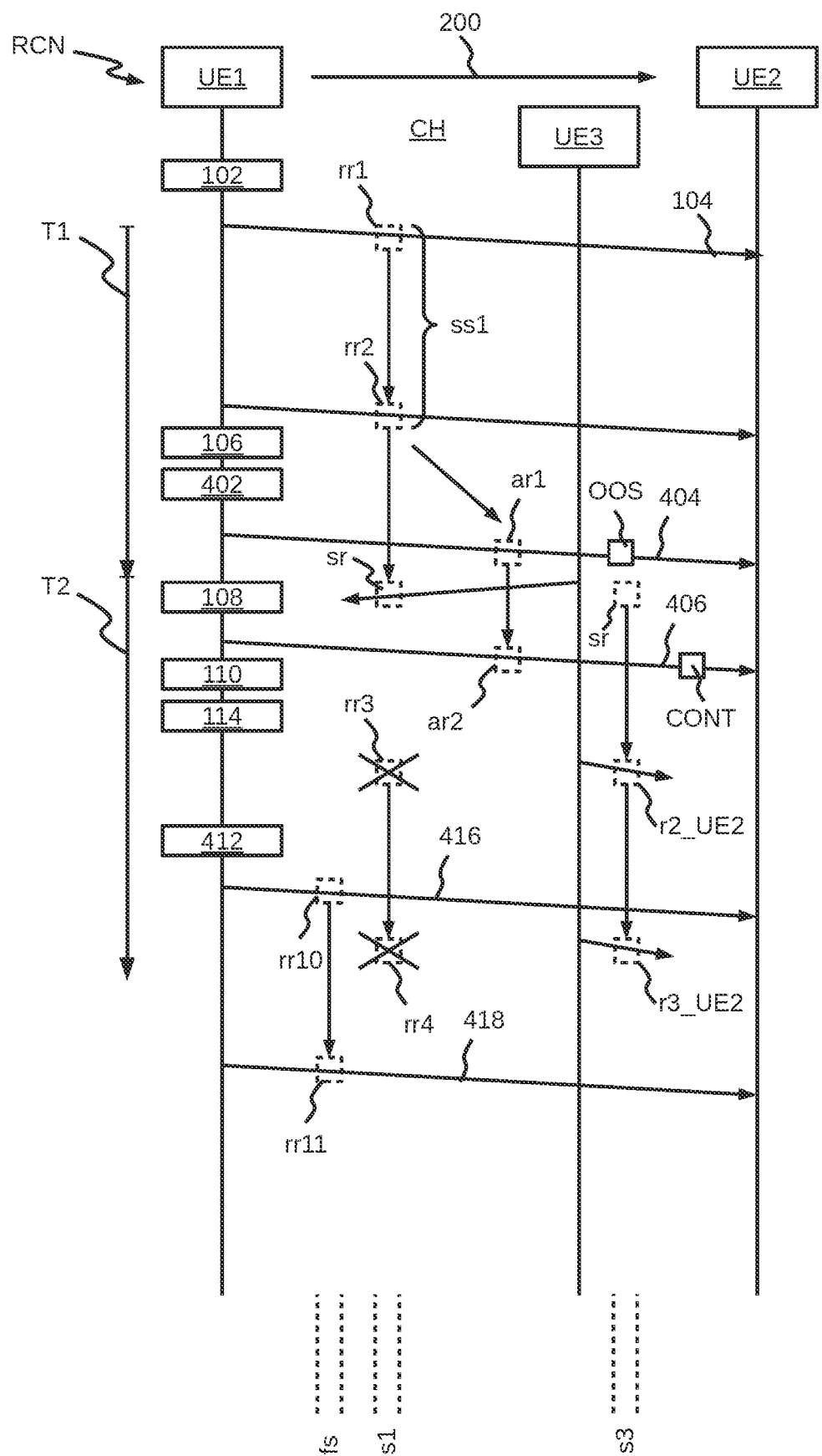

FIG. 4 depicts a schematical sequence diagram for operating the radio communications network RCN.

According to a step 402, the first radio terminal UE1 determines at least one auxiliary radio resource ar1, ar2, wherein the at least one auxiliary radio resource ar1, ar2 and the set s1 of SPS radio resources rr1-rr4 are disjoint.

According to an example, the step 402 comprises to randomly select the time and frequency resources for SL-SCH and SCI of a sidelink grant from the selected resource pool. The random function shall be such that each of the allowed selections can be chosen with equal probability.

According to steps 404, 406, the first radio terminal UE1 transmits, towards the at least one second radio terminal UE2, data via the at least one auxiliary radio resource ar1; ar2.

According to the step 404, the data transmitted via the at least one auxiliary radio resource ar1; ar2 comprises the out-of-sequence indicator OOS, which indicates that the auxiliary radio resource ar1; ar2 is an auxiliary radio resource ar1; ar2.

According to the step 406, the first radio terminal UE1 transmits, towards the at least one second radio terminal UE2, the contention indicator CONT, wherein the transmitted contention indicator CONT indicates a contention situation at the at least one sensing resource sr and the identity of the at least one sensing resource sr.

According to an example, the refraining, according to the step 114, comprises: determine, according to a step 412, after the SPS configuration has lapsed, a further SPS configuration for the first radio terminal UE1, wherein the further SPS configuration indicates a further set fs of further SPS radio resources rr10, rr11 of the shared device-to-device radio channel CH, in particular of the sidelink channel, SL-CH, wherein the indicated further SPS radio resources rr10, rr11 are intended for a transmission by the first radio terminal UE1; and start transmitting, according to steps 416, 418, towards the at least one second radio terminal UE2, data via the further set fs of SPS radio resources rr10, rr11 if the time period T2 since the sensing 108 of the at least one sensing resource sr and before the first transmission via the further set of SPS radio resources rr10, rr11 has not lapsed.

The auxiliary radio resources ar1, ar2 are located before and after the sensing resource sr for performing sensing measurement. Of course, only one of the auxiliary radio resources ar1, ar2 can be used to transmit data towards the second radio terminal UE2.

According to an example, the first radio terminal UE1 selects, according to step 402, an out-of-sequence-transmission time/frequency resource in the sense of an auxiliary radio resource ar1, ar2 within a selection window of a length T_slots, which does not include any of the configured SPS sidelink resources rr1 to rr4.

According to an example, the first radio terminal UE1 extends transmission of the data, the first radio terminal UE1 transmitting via the at least one auxiliary radio resource ar1, ar2, which may be reserved by the next configured resources following the triggering condition.

Once the triggering condition arises, the first radio terminal UE1 selects from a new or an old configured or preconfigured sensing window radio resources for transmission, which could be:

- single radio resource transmitted once in a selection window directly after the triggering event and before the skipped transmission opportunity in the sense of the sensing resource sr;
- a single radio resource transmitted once in the selection window directly after the triggering event and after skipping the next possible transmission opportunity in the sense of the sensing resource sr after the said triggering event;
- a single radio resource (transmitted in more than one selection window, i.e., current following the event and the following ones. This could be sent before or after a skipped transmission opportunity;
- resources within the same selection window, i.e., following a transmission time/frequency patterns. Those resources or those sub-resources can be used to guarantee enough transmission opportunities for other UEs to detect the out of sequence situation.

According to an example, if retransmission is activated, for example HARQ retransmission, the first radio terminal UE1 selects, according to step 402, at least one of the retransmission opportunities, occurring before or after a skipped configured sidelink grant, to be the at least one auxiliary radio resource ar1, ar2.

According to an example, the first radio terminal UE1 randomizes the position of the at least one auxiliary radio resource ar1, ar2 if the data is transmitted more than once during the time of configured SPS sidelink resources rr1-rr4.

According to an example, the data transmitted via the at least one auxiliary radio resource ar1, ar3, in particular comprises a preconfigured or configurable pattern if the data is transmitted more than once during the time of a configured sidelink resources in order to identify that the data transmission is repeated.

The data transmitted via the at least one auxiliary radio resource ar1, ar2, in particular out-of-sequence transmission content, the message sidelink control information (SCI) sent over physical control channel or the message control channel sent over the shared data channel, comprises at least one of the following:

- An identifier or a field or at least one bit in the sidelink control information indicating that this transmission is an out-of-sequence of a configured (periodic) sidelink resources, wherein this field for collision can be either exist "TRUE" or not "FALSE"; additionally, an identifier to the colliding resources (as reserved in Time/ frequency) or an identifier to the SPS/Configured-grant index (if exist) that is contention-affected;
- For preserving the original configured resources, a reservation for the skipped (and canceled) transmission slot in the sense of the sensing resource sr;
- A reservation to a subsequent transmission within the configured SPS radio resources rr3, rr4, where the first radio terminal UE1 is intending to resume the configured (periodic) transmission; If the UE1 wants to resume (e.g., after indicating a resuming intention), and the UE1 decided to resume on the same, previously reserved, SPS/configured-grant resources, then the UE1 is requested to send the reservation to a subsequent transmission within the same configured resources where the UE1 is intending to resume the same configured (periodic) SPS transmission. This is important to those UEs who can only decode the out of sequence transmission;
- Else, if the UE1 wants to resume (e.g., after indicating a resuming intention), and the UE1 decided to resume on time frequency resources, then the UE1 is requested to send a new periodic reservation interval for the said configured resources to be used after when the UE1 indicates continuation for the (periodic) transmission;
- the QoS of the said UE transmission, or the new QoS of the continuation of the said transmission sequence, i.e., if the UE has to increase the QoS of the said SPS transmission to resolve the collision
- The periodic reservation interval for the said configured SPS radio resources rr3, rr4 to be used after when the first radio terminal UE1 indicates continuation for the (periodic) transmission; and
- A cancelation to the remaining configured resources rr3, rr4 if the first radio terminal UE1 identified a possible collision, or resource contention of a higher QoS transmission of another UE or half-duplex problem.

The first radio terminal UE1 informs other radio terminals, for example the radio terminal UE3, about their collision or half-duplex problem by transmitting a corresponding indicator like OOS towards the at least one radio terminal UE3 in the vicinity of the first radio terminal UE1. According to an example, the first radio terminal UE1 sends a unicast sidelink control information or sidelink radio resource control (RRC) information to the colliding/half-duplex UE3. According to another example, the first radio terminal UE1 sends a groupcast sidelink control information or groupcast sidelink radio resource control (RRC) to all possible colliding/half-duplex UEs or UEs with a communication range of the first radio terminal UE1. This collision/half-duplex problem resolution communication range can be configured/pre-configured for the first radio terminal UE1. According to another example, the first radio terminal UE1 sends a broadcast sidelink control information or broadcast sidelink radio resource control (RRC) information or sidelink master information block to all UEs in the field.

The control information of the data transmitted via the auxiliary radio resources ar1, ar2 includes an identifier to collision/half-duplex problem on a said reservation period/SPS-index (if exist), the QoS of the said UE transmission, the intention of UE1 to resume or to cancel the said transmission.

Figure 5:
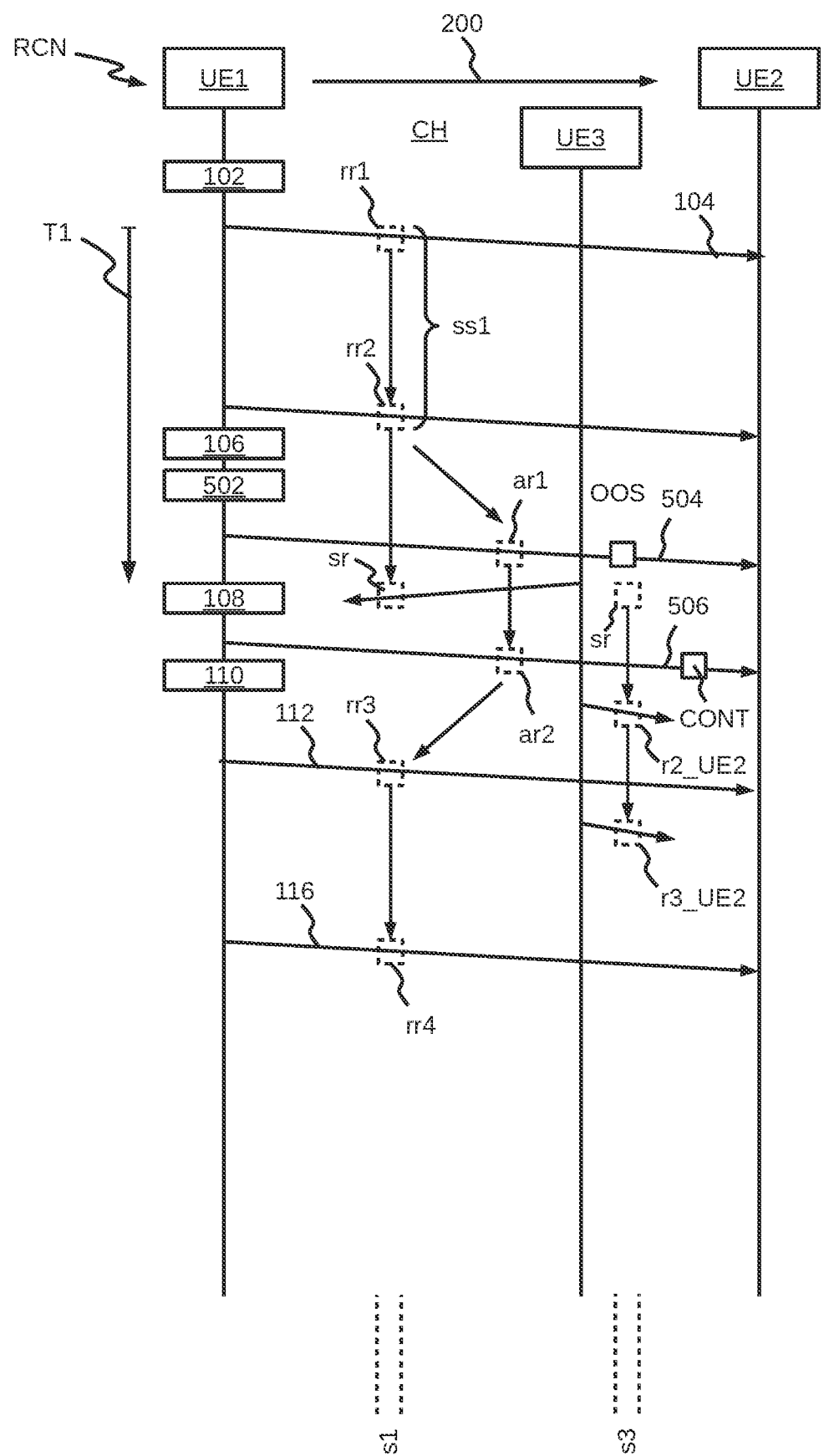

According to an example, once the first radio terminal UE1 starts the transmission via the auxiliary radio resources ar1, ar2 periodically in multiple selection windows, the first radio terminal UE1 transmits multiple out-of-sequence transmissions until it resumes the original configured SPS resources as exemplified in FIG. 5. Hence, if the first radio terminal UE1 transmits more than one out-of-sequence transmission before resuming the transmission via the granted SPS radio resources, the first radio terminal UE1 may also be configured to select: random radio resources for each out-of-sequence transmission (the multiple out-of-sequence transmissions), or a set of resources following a configured time/frequency resource pattern map for the multiple out-of-sequence transmissions. However, if an N consecutive configured resources elapse, the first radio terminal UE1 performs a reselection and deletes the originally reserved SPS radio resources. In another example, the first radio terminal UE1 selects to perform out-of-sequence transmissions until a completely new configured SPS radio resources are selected.

For selecting the out-of-sequence resources, the selection window of a length T_slots may be considered for this process as follows, either: the same window size and location as the original SPS/configured sidelink resources selection window, or a window different from the original SPS/configured sidelink resources selection window, which can also be considered to either include any of the reserved configured sidelink resources, but exclude them during resource selection, or to be a short selection window that exclude all originally reserved resources. In the latter option, i.e., the sensing window for out-of-sequence transmission(s) does not include the original resources; the first radio terminal UE1 may consider a short sensing window for this operation.

According to an example, if the first radio terminal UE1 is extending its transmission on its originally reserved SPS resources according to FIG. 5, e.g., for QoS or stringent latency requirements, the first radio terminal UE1 may only consider continuing the original resource reservation no more than a T_relax slots elapse. Hence, after a triggering event plus a time T2 (with a maximum value T_relax), the radio terminal UE1 performs grant skipping and allows sensing in such a situation. Additionally, the first radio terminal UE1 transmits an out-of-sequence transmission via the auxiliary radio resources ar1, ar2 as described above.

FIG. 5 depicts a schematical sequence diagram for operating the radio communications network RCN.

According to a step 502, the first radio terminal UE1 determines the at least one auxiliary radio resource ar1, ar2, wherein the at least one auxiliary radio resource ar1, ar2 and the set s1 of SPS radio resources rr1-rr4 are disjoint.

According to steps 504, 506, the first radio terminal UE1 transmits, towards the at least one second radio terminal UE2, data via the at least one auxiliary radio resource ar1; ar2.

According to an example, the first radio terminal UE1 is configured to send data via more than one auxiliary radio resources ar1 and ar2 before resuming the transmission via the SPS resources rr3 and rr4. In this case, the first radio terminal UE1 is configured to: Select random auxiliary radio resources ar1, ar2 for each out-of-sequence transmission, and/or select a resource pattern for the auxiliary radio resources ar1, ar2.

FIG. 6 depicts a problem of the prior art. For periodic data transmission in Mode 2 resource allocation, semi-persistent scheduling SPS is used. In this case, the UEA performs a sensing mechanism where the UEA selects transmission resources in time and frequency. Similar identical copy of these resources (in both time and frequency) are repeated at a period selected from enumerated (configured or pre-configured values). Once the initial transmission is selected, the UEA adds to its sidelink control information (SCI) the time resources (e.g., slot index in a resource-pool), the frequency resources (e.g., as a subchannels start index and the number of contiguous N subchannels), and the reservation period P_resv. The initial transmission does not indicate for how many periods are these resources reserved.

UEB being able to successfully decode the initial SCI (or any subsequent SCI) can indicate those resources to be reserved for multiple periods.

However, if UEC cannot successfully receive the initial SCI or the subsequent SCIs on the physical sidelink control channel, PSCCH, UEC will fail to indicate those resources as reserved. In this case, UE3 is allowed to reselect those resources for their own transmission producing collisions on the physical sidelink shared channel, PSSCH.

UE3 may fail to decode an SCI if any of these cases occur: The transmission blocks (including the intended SCI) is overlapping with the UE's own transmission in the same time and frequency resources; The transmission blocks (including the intended SCI) is overlapping with the UE's own transmission in the same time resources but different frequency resources; Due to channel path-loss and propagation errors.

FIG. 7 depicts a structure of the radio terminal UE1. Said radio terminal UE1 comprises at least one processor P, at least one memory M comprising computer program code CP, at least one communication module C, and at least one antenna A, wherein the computer program code CP is configured to interact with the at least one processor P, the at least one communication module C, and the at least one antenna A to cause the radio terminal UE1 to conduct the methods described above.

The invention claimed is:

1. A first radio terminal (UE1) of a radio communications network, the first radio terminal comprising:
an electronic processor, a communication module, and an antenna, wherein the electronic processor is configured, together with the communication module, and the antenna, to cause the radio terminal to perform a set of operations including:
determining a configuration for the first radio terminal (UE1), wherein the configuration indicates radio resources (rr1-rr4) of a shared device-to-device radio channel (CH), wherein the indicated radio resources (rr1-rr4) are intended for a transmission by the first radio terminal (UE1);
selecting a sensing resource (sr) of the radio resources (rr1-rr4);
sensing the sensing resource (sr);
determining a contention indicator (CONT) based on the sensing resource (sr); and
transmitting, towards a second radio terminal (UE2), the contention indicator (CONT),
wherein the transmitted contention indicator indicates a contention situation at the sensing resource (sr) and the identity of the sensing resource (sr).

2. The first radio terminal (UE1) according to claim 1, the set of operations further include:
transmitting, towards the second radio terminal (UE2), a sensing indicator, which indicates an identity of a subsequent radio resource for sensing by the first radio terminal (UE1).

3. The first radio terminal (UE1) according to claim 2, wherein transmitting the sending indicator causes the second radio terminal (UE2) to refrain from using the subsequent radio resource for transmission.

4. The first radio terminal (UE1) according to claim 2, wherein the set of operations further include:
transmitting, towards the second radio terminal (UE2), a reservation indicator, which indicates an identity of the subsequent radio resource or a subsequent auxiliary radio resource for transmitting by the first radio terminal (UE1).

5. The first radio terminal (UE1) according to claim 4, wherein transmitting the reservation indicator causes the second radio terminal (UE2) to refrain from using the subsequent radio resource or subsequent auxiliary radio resource for transmission.

6. The first radio terminal (UE1) according to claim 1, wherein the set of operations further include:
   determining at least one auxiliary radio resource (ar1; ar2), wherein the at least one auxiliary radio resource (ar1; ar2) and the radio resources (rr1-rr4) are disjoint; and
   transmitting, towards the at least one second radio terminal (UE2), data via the at least one auxiliary radio resource (ar1; ar2).

7. The first radio terminal (UE1) according to claim 6, wherein the data transmitted via the auxiliary radio resource includes an out-of-sequence indicator, the out-of-sequence indicator indicating that the auxiliary radio resource is an auxiliary radio resource.

8. The first radio terminal (UE1) according to claim 1, wherein determining the contention indicator (CONT) includes:
   determining a received signal strength for the at least one sensing resource (sr);
   comparing the received signal strength with a threshold; and
   determining the contention indicator (CONT) in dependence on the comparison.

9. The first radio terminal (UE1) of claim 2, wherein refraining from using the subsequent radio resource for transmission or subsequent auxiliary radio resource for transmission includes one of skipping, sub-slot skipping, delayed skipping, or early skipping.

10. A method to operate a first radio terminal (UE1) of a radio communications network, the method comprising:
    determining a configuration for the first radio terminal (UE1), wherein the configuration indicates radio resources (rr1-rr4) of a shared device-to-device radio channel (CH), wherein the indicated radio resources (rr1-rr4) are intended for a transmission by the first radio terminal (UE1);
    selecting a sensing resource (sr) of the radio resources (rr1-rr4);
    sensing the sensing resource (sr);
    determining a contention indicator (CONT) based on the sensing resource (sr); and
    transmitting, towards a second radio terminal (UE2), the contention indicator (CONT),
    wherein the transmitted contention indicator indicates a contention situation at the sensing resource (sr) and the identity of the sensing resource (sr).

11. The method according to claim 10, further comprising:
    transmitting, towards the second radio terminal (UE2), a sensing indicator, which indicates an identity of a subsequent radio resource for sensing by the first radio terminal (UE1).

12. The method according to claim 11, wherein transmitting the sending indicator causes the second radio terminal (UE2) to refrain from using the subsequent radio resource for transmission.

13. The method according to claim 11, further comprising:
    transmitting, towards the second radio terminal (UE2), a reservation indicator, which indicates an identity of the subsequent radio resource or a subsequent auxiliary radio resource for transmitting by the first radio terminal (UE1).

14. The method according to claim 13, wherein transmitting the reservation indicator causes the second radio terminal (UE2) to refrain from using the subsequent radio resource or subsequent auxiliary radio resource for transmission.

15. The method according to claim 10, further comprising:
    determining at least one auxiliary radio resource (ar1; ar2), wherein the at least one auxiliary radio resource (ar1; ar2) and the radio resources (rr1-rr4) are disjoint; and
    transmitting, towards the at least one second radio terminal (UE2), data via the at least one auxiliary radio resource (ar1; ar2).

16. The method according to claim 15, wherein the data transmitted via the auxiliary radio resource includes an out-of-sequence indicator, which indicates that the auxiliary radio resource is an auxiliary radio resource.

17. The method according to claim 10, wherein the determining the contention indicator (CONT) includes:
    determining a received signal strength for the at least one sensing resource (sr);
    comparing the received signal strength with a threshold; and
    determining the contention indicator (CONT) in dependence on the comparison.

18. The first radio terminal (UE1) of claim 12, wherein refraining from using the subsequent radio resource for transmission or subsequent auxiliary radio resource for transmission includes one of skipping, sub-slot skipping, delayed skipping, or early skipping.

* * * * *